(12) United States Patent
Liu et al.

(10) Patent No.: US 6,238,561 B1
(45) Date of Patent: May 29, 2001

(54) CORRUGATED AXIAL FILTER WITH SIMPLE FOLD PATTERN AND METHOD OF MAKING IT

(75) Inventors: Zhili G. Liu, Madison; Tadeusz Jaroszczyk; Jerald J. Moy, both of Stoughton, all of WI (US)

(73) Assignee: Nelson Industries, Inc., Stoughton, WI (US)

( * ) Notice: Subject to any disclaimer, the term of this patent is extended or adjusted under 35 U.S.C. 154(b) by 0 days.

(21) Appl. No.: 09/405,033

(22) Filed: Sep. 24, 1999

(51) Int. Cl.[7] ................................... B01D 27/06
(52) U.S. Cl. ..................... 210/493.4; 210/493.5; 210/492; 210/497.1; 55/521
(58) Field of Search ............... 210/493.4, 493.1, 210/497.1, 492, 487, 494.1, 493.5, 488; 55/521, 497–498, 500

(56) References Cited

U.S. PATENT DOCUMENTS

| | | |
|---|---|---|
| 2,943,700 | * 7/1960 | Bub . |
| 3,112,184 | * 11/1963 | Hollenbach . |
| 3,216,578 | * 11/1965 | Wright et al. . |
| 3,243,943 | * 4/1966 | Getzin . |
| 3,966,646 | * 6/1976 | Noakes et al. . |
| 4,976,857 | 12/1990 | Solomon . |
| 5,501,794 | * 3/1996 | Van De Graaf et al. ......... 210/493.3 |
| 6,010,548 | * 1/2000 | Burkhead et al. ..................... 55/378 |

FOREIGN PATENT DOCUMENTS

| | | |
|---|---|---|
| 0783914 | 7/1997 | (EP) . |
| 10043534 | 2/1998 | (JP) . |

* cited by examiner

Primary Examiner—W. L. Walker
Assistant Examiner—Marianne S. Ocampo
(74) Attorney, Agent, or Firm—Andrus, Sceales, Starke & Sawall, LLP

(57) ABSTRACT

A corrugated axial filter (148) has a plurality of flow channels (178, 180, 182, 184, 208, 212) extending axially from the upstream dirty frontside (146) of the filter to the downstream clean backside (160) of the filter. Each channel has an upstream opening (186) at the upstream dirty frontside and has top and bottom walls (188 and 190) and right and left sidewalls (192 and 194) extending from the opening rearwardly toward the downstream clean backside. The right and left sidewalls taper towards each other as they extend rearwardly to define a triangular shaped flow channel. Right and left sidewalls of adjacent flow channels are a single continuous sheet of filter material (130) in a zig-zag pattern (134) with a plurality of fold lines including a first set of fold lines (136, 138, 140, 142, 144) at the upstream dirty frontside and a second set of fold lines (150, 152, 154, 156, 158) at the downstream clean backside.

10 Claims, 3 Drawing Sheets

CORRUGATED AXIAL FILTER WITH SIMPLE FOLD PATTERN AND METHOD OF MAKING IT

BACKGROUND AND SUMMARY

The invention relates to corrugated axial filters, and more particularly, to a fold pattern and orientation facilitating improved structural configurations and ease of manufacturing.

Corrugated axial filters are known in the prior art and are typically used in applications where it is desired to package more filter media in a compact volume than obtainable with radial pleated filters. The corrugated axial filter enables reduction in filter size and/or increased filter capacity, for example, increased dust holding capacity in the case of an air filter. The corrugated axial filter is formed by a plurality of parallel flow channels or flutes having alternately sealed ends, such that fluid entering an open end of a channel must pass through the filter media forming the wall of the channel and then exit the opposite open end of the adjacent channel.

Various problems have been encountered in corrugated axial filters, including in air filter applications. One of the problems is that the dust cake is not uniformly formed because of non-uniform flow across the filter media. This is objectionable because the filter media area cannot be fully utilized for high dust-holding capacity. Furthermore, such non-uniformity may actually reduce dust-holding capacity. Another problem is high flow restriction due to the large sealed area at the end of the channel or flute. Another problem is that the area of the channel or flute end is too big to be completely sealed, and hence leakage is common, and the filter may not be reliable for its purpose of primary filtration. Furthermore, the large sealing area is subject to high aerodynamic pushing force during flow, which force increases with time and can eventually open some sealed ends and cause the filter to malfunction. The sealed ends act like particle impactors. Large particles collect at such sealed ends and form dust cakes. The dust cakes grow and block other channel or flute open ends, ultimately resulting in filter clogging after relatively low dust loading.

The present invention addresses the above problems and improves overall performance. The invention enables use of a simple fold pattern, easy manufacturing steps, and enables a variety of structural configurations. Dust holding capacity is increased due to a more uniform dust flow field and maximum use of filter media surface. Optimized flow channels provide lower pressure drop. Significantly smaller sealing edges, instead of large open ends, use much less adhesive material and also reduce leakage possibilities. Geometrically more stable channels are provided which are harder to be compressed and thus provide greater structural integrity. Large inlet and outlet openings reduce filter clogging. A simple known folding method is utilized, instead of prior complicated folding patterns such as oblique folds requiring partial double layers and apex tip joint sealing. The invention enables efficient and economical manufacturing methods.

DETAILED DESCRIPTION

Prior Art

Figure 1:
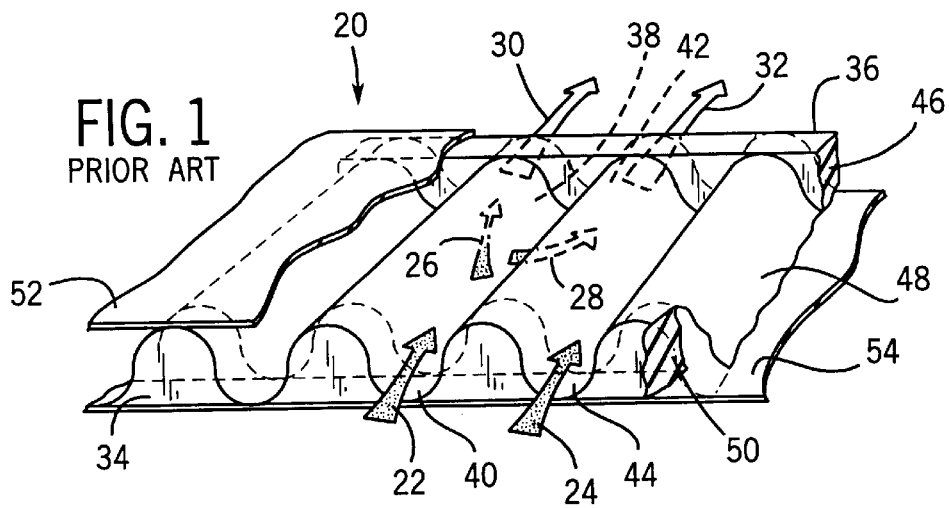
FIG. 1 is schematic perspective view partially cut away of a portion of a corrugated axial filter known in the prior art.

FIG. 1 shows a corrugated axial filter 20 for filtering fluid, such as air, gas or liquid, the fluid flowing axially as shown at arrows 22, 24, 26, 28, 30, 32. The filter has an upstream dirty frontside 34 and a downstream clean backside 36. The filter has a plurality of flow channels 38, 40, 42, 44, etc. extending axially from upstream dirty frontside 34 to downstream clean backside 36. Alternating flow channels such as 40 and 44 have upstream openings at upstream dirty frontside 34 for receiving incoming dirty air flow as shown at arrows 22 and 24, respectively. The downstream ends of channels 40 and 44 are closed by adhesive material 46, and hence the air must pass through the filter media provided by corrugated sheet 48, as shown at arrow 26 from channel 40 through the filter media into channel 38, and as shown at arrow 28 from channel 40 through the filter media into channel 42. Channels 38 and 42 are open at their downstream ends and hence the clean filtered air exits therefrom as shown at arrows 30 and 32, respectively. The upstream ends of channels 38 and 42 are sealed closed by adhesive material 50. The channels have left and right sidewalls formed by the corrugations of the sheet of filter material 48, and have top and bottom walls formed by flat planar sheets 52 and 54, respectively.

Figure 2:
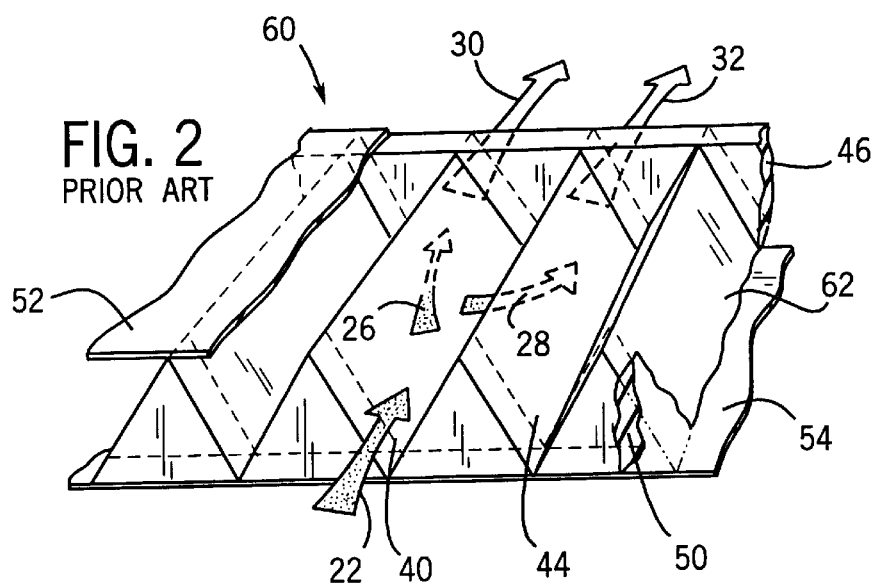
FIG. 2 is like FIG. 1 and shows another corrugated axial filter known in the prior art.

FIG. 2 shows another corrugated axial filter 60 known in the prior art and is similar to FIG. 1 and uses like reference numerals where appropriate to facilitate understanding. Instead of the curved wave or washboard ripple shaped corrugated sheet of filter material 48 of FIG. 1, the filter of FIG. 2 uses a corrugated sheet of filter material 62 which is folded along sharper fold or crease lines in accordion or bellows like manner to yield flow channels having a sharper or more triangular configuration in cross-section.

Figure 3:
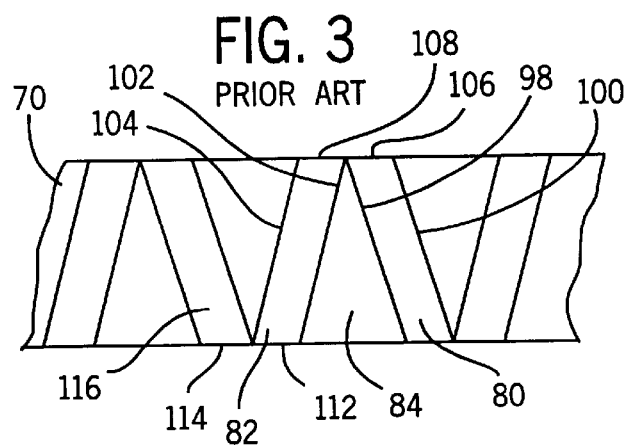
FIG. 3 is a top plan view of a sheet of filter material prior to folding, and illustrating a fold pattern known in the prior art.
Figure 4:
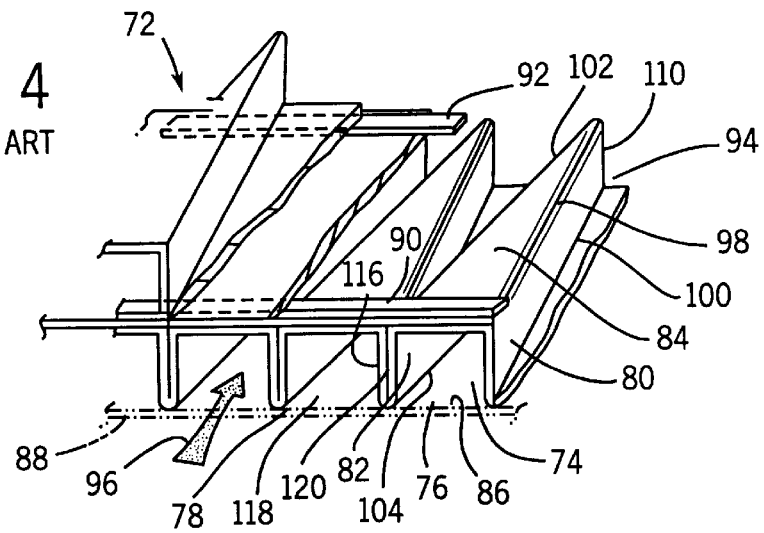
FIG. 4 is a perspective view partially cut away of a corrugated axial filter known in the prior art, after folding in accordance with the fold pattern of FIG. 3.

FIG. 3 shows a top plan view of a flat strip of filter material 70 before folding, and FIG. 4 shows the corrugated axial filter 72 constructed therefrom after folding, as another example of a corrugated axial filter known in the prior art. Strip 70, FIG. 3, is folded along the oblique fold lines shown to yield the structure shown in FIG. 4, including a channel 74 having an upstream opening 76 at the upstream dirty frontside 78 of the filter, right and left sidewalls 80 and 82, and a top wall 84. Bottom wall 86 is provided by a flat planar sheet of filter material 88 therebelow. This structure is shown in Ishii et al U.S. Pat. No. 4,925,561, incorporated herein by reference. The rows of stacked channels may have spacer strips of tape such as 90 and 92 therebetween. Right and left channel sidewalls 80 and 82 taper towards each other as they extend rearwardly toward downstream clean backside 94 of the filter. Air flows axially into the channels as shown at arrow 96.

The upper edge of right sidewall 80, FIG. 4, is formed by fold line 98, FIG. 3. The lower edge of right sidewall 80 is formed by fold line 100. The upper edge of left sidewall 82 is formed by fold line 102. The lower edge of left sidewall 82 is formed by fold line 104. The right edge of top wall 84 is formed by fold line 98. The left edge of top wall 84 is formed by fold line 102. As seen in FIGS. 3 and 4, top wall 84 has a triangular shape. Air flowing into the channel must flow either through right sidewall 80 or left sidewall 82. The downstream ends 106 and 108, FIG. 3, of right and left sidewalls 80 and 82. respectively, after the noted folding, meet at a downstream apex 110, FIG. 4, and are adhesively sealed or affixed to each other. Upstream end 112, FIG. 3, of sidewall 82 and upstream end 114 of sidewall 116 of adjacent channel 118 meet at an upstream apex 120 after folding, and are adhesively affixed or sealed to each other.

The complicated folding pattern of FIGS. 3 and 4, the requirement of adhesively sealing the upstream and downstream apexes, and the double wall thickness along some of the channel walls have been found objectionable, including for manufacturing, constructional, and performance reasons. The oblique and angled folding pattern of FIG. 3 requires special handling and does not facilitate economical manufacturing assembly. The joints at front and rear apexes 120 and 110 are objectionable because they tend to open during operational fluid flow because they face the flow directly and experience high stress, especially after dust cake build-up. Double wall thicknesses along some of the channel walls is objectionable because the double layering provides different restriction and filtration efficiency as compared to single layered walls, i.e. not all channel walls have the same restriction and filtration efficiency.

PRESENT INVENTION

Figure 5:
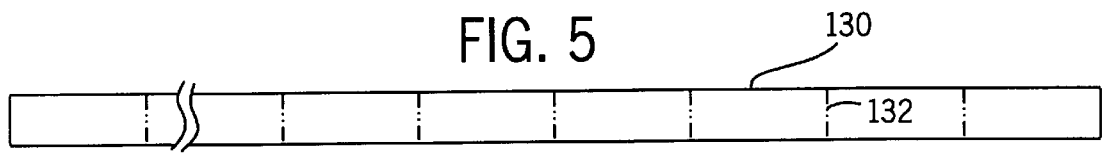
FIG. 5 is a top plan view like FIG. 3 but illustrating a fold pattern in accordance with the present invention.

FIG. 5 shows a flat planar sheet or strip of filter material 130 prior to folding. Fold lines are shown at dashed lines such as 132. Sheet 130 is a single continuous sheet of filter material folded in a zig-zag pattern as shown at 134 in FIG. 6. The pattern has a plurality of fold lines 132 including a first set of fold lines 136, 138, 140, 142, 144, etc. at the upstream dirty front side 146, FIG. 7, of filter 148, and a second set offold lines 150, 152, 154, 156, 158, etc., at downstream clean backside 160 of the filter. Corrugated axial filter 148 filters fluid such as air as shown at dirty air arrows 162, 164, 165, etc., flowing axially into the upstream dirty frontside 146 of the filter, which air is filtered by passing through the filter media as shown at arrows 166, 168, 170, 172, etc., and then the filtered clean air exits axially from downstream clean backside 160 as shown at arrows such as 174 and 176. Filter 148 has plurality of flow channels 178, 180, 182, 184, etc., extending axially from upstream dirty frontside 146 to downstream clean backside 160. Each channel has an upstream opening such as 186 at upstream dirty frontside 146 and has top and bottom walls 188 and 190 and right and left sidewalls 192 and 194 extending from opening 186 rearwardly toward downstream clean backside 160. Right and left sidewalls 192 and 194 taper towards each other as they extend rearwardly to define a triangular shaped flow channel 180. Right and left sidewalls of adjacent flow channels are a single continuous sheet of filter material 130 in the noted zig-zag pattern 134 with the noted plurality of fold lines including the noted first set of fold lines 136, 138, 140, 142, 144 at upstream dirty frontside 146, and the noted second set of fold lines 150, 152, 154, 156, 158 at downstream clean backside 160. In contrast to the construction of FIGS. 3 and 4, the single continuous sheet 130 in FIGS. 5–7 forms only the sidewalls such as 192 and 194 of the flow channels, not top wall 188. In FIGS. 3 and 4, strip 70, after folding, forms right and left sidewalls 80 and 82 and also top wall 84.

Figure 7:
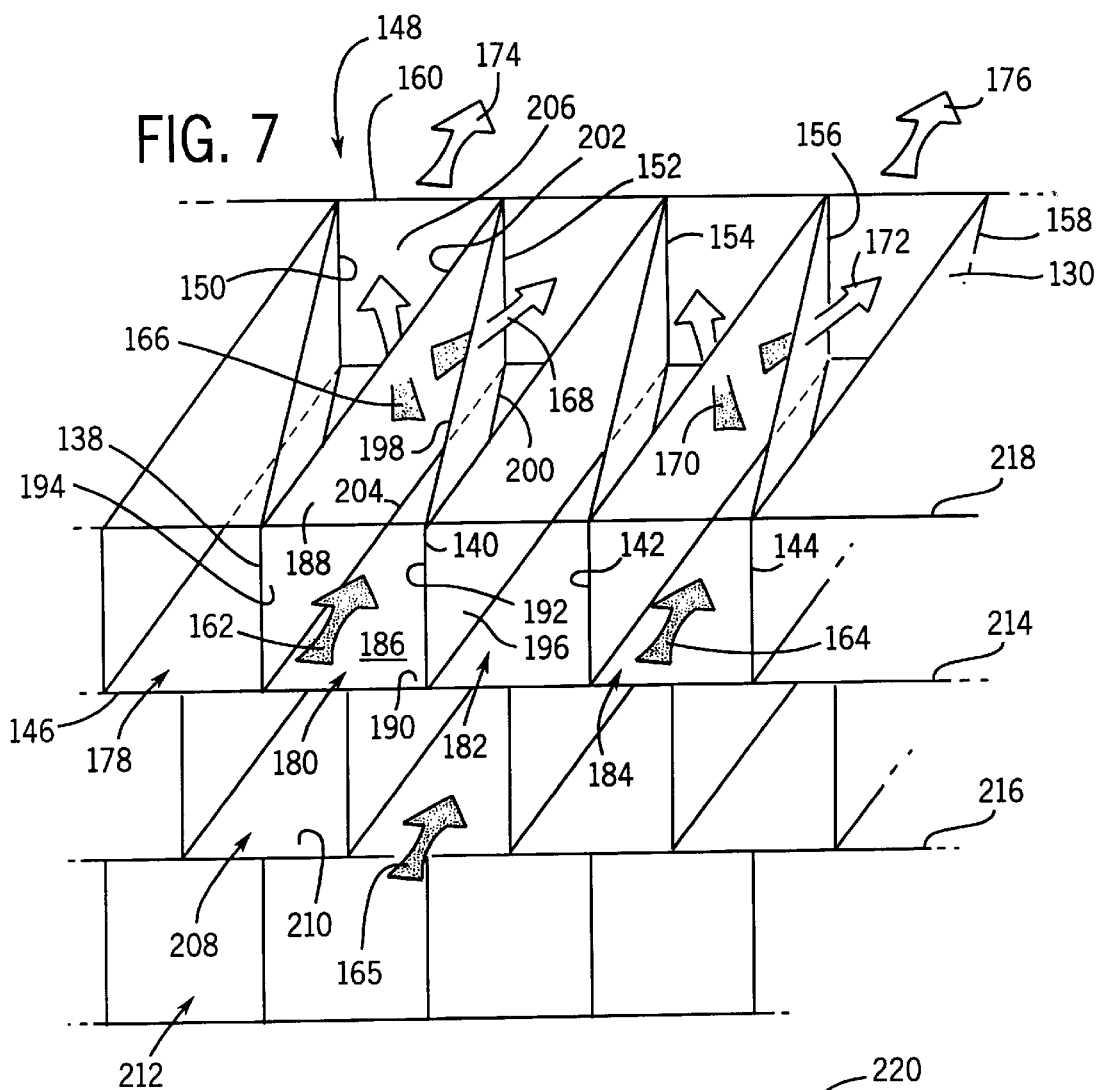
FIG. 7 is an assembled view of a corrugated axial filter constructed in accordance with the invention and formed in a stack.

Right and left sidewalls 192 and 194, FIG. 7, meet at a downstream apex of a triangle, such downstream apex being one of the fold lines such as 152 of the noted second set of fold lines. Right sidewall 192 meets a left sidewall 196 of adjacent flow channel 182 at an upstream apex of a triangle, the upstream apex being one of the fold lines such as 140 of the noted first set of fold lines. Sidewalls 192 and 194 meeting at downstream apex 152 are unitary with each other and are comprised of the noted single continuous sheet 130 of filter material without sealing adhesive joining them. This is in contrast to the construction of FIGS. 3 and 4 where sidewalls 80 and 82 meeting at downstream apex 110 have sealing adhesive joining them at ends 106 and 108. Sidewalls 192 and 196 meeting at upstream apex fold line 140 are unitary with each other and are comprised of the noted single continuous sheet 130 of filter material without sealing adhesive joining them. This is in contrast to the construction of FIGS. 3 and 4 where sidewalls 82 and 116 meeting at upstream apex 120 have sealing adhesive joining them at ends 112 and 114.

Figure 6:
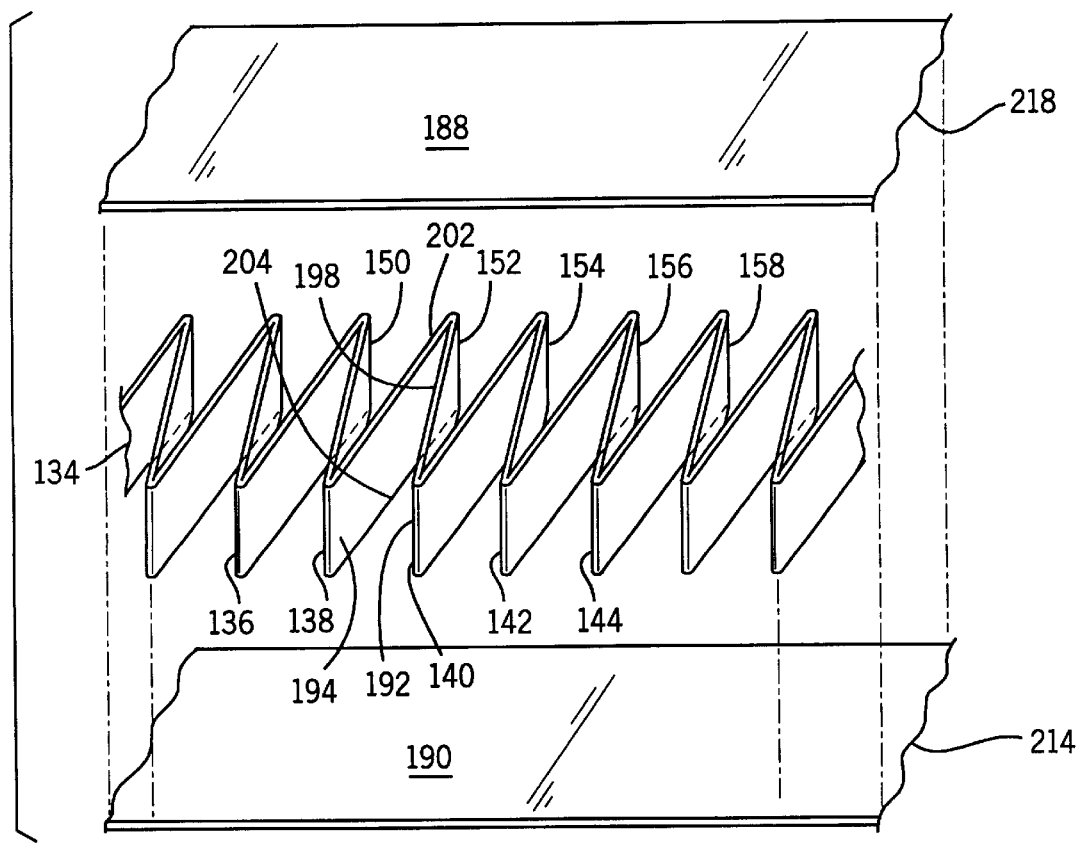
FIG. 6 is an exploded perspective view of a portion of a corrugated axial filter constructed in accordance with the invention, including the sheet of FIG. 5 after folding.

Right sidewall 192, FIGS. 6 and 7, has a top edge 198 adhesively sealed to top wall 188. Right sidewall 192 has a bottom edge 200 adhesively sealed to bottom wall 190. Left sidewall 194 has a top edge 202 adhesively sealed to top wall 188. Left sidewall 194 has a bottom edge 204 adhesively sealed to bottom wall 190. Flow channel 180 has no other adhesively sealed joints. This is desirable because it eliminates the large open areas otherwise requiring sealing at the upstream or downstream ends of the channels such as 50 and 46, respectively, in FIGS. 1 and 2. The elimination of such large open area requiring sealing significantly reduces leakage possibilities. Another benefit is reduction in the amount of adhesive required.

The noted first set of fold lines includes distally opposite right and left fold lines such as 140 and 138 defining in combination with top and bottom walls 188 and 190 the noted upstream opening 186 having a face lying in a first plane normal to the direction of incoming fluid flow as shown at 162. The noted second set of fold lines includes right and left distally opposite fold lines such as 152 and 150 defining in combination with top and bottom walls 188 and 190 a downstream opening 206 having a face lying in a second plane normal to the direction of outgoing fluid flow as shown at 174. Right and left fold lines 140 and 138 of the noted first set each lie in the noted first plane. Right and left fold lines 152 and 150 of the noted second set each lie in the noted second plane. The fold lines extend upwardly and downwardly between top and bottom walls 188 and 190.

FIG. 7 shows a plurality of rows of flow channels layered on top of each other to form a stack. Top wall 190 of flow channel 208 is the bottom wall 190 of flow channel 180 immediately above channel 208. Bottom wall 210 of flow channel 208 is the top wall of flow channel 212 immediately below flow channel 208. A non-doubled single layer second sheet of filter or non-filter material 214 provides both the top wall of flow channel 208 and the bottom wall of flow channel 180. Sheet 214 has a top surface facing upwardly into flow channel 180, and a bottom surface facing downwardly into channel 208. A non-doubled single layer third sheet 216 provides both the bottom wall of flow channel 208 and the top wall of flow channel 212. Sheet 216 has a top surface facing upwardly into flow channel 208, and a bottom surface facing downwardly into flow channel 212. The total combined thickness of the top wall of flow channel 208 and the bottom wall of flow channel 180 is a single layer thickness provided by sheet 214. The total combined thickness of the bottom wall of flow channel 208 and the top wall of flow channel 212 is a single layer thickness provided by sheet 216. In one constructional method, zig-zag pattern 134 is adhesively joined to sheet 214, FIG. 6, to provide a single row or modular unit, and multiple rows or modular units are then stacked one on top of another, with the uppermost row having a top covering sheet 218 applied thereto to provide the top wall 188 for the uppermost row of flow channels. Alternately, each row may have its own bottom wall and top wall provided by respective sheets of filter or non-filter material. However, this is not preferred in some implementations because of the resulting double layer thickness in a top or bottom wall.

Figure 8:
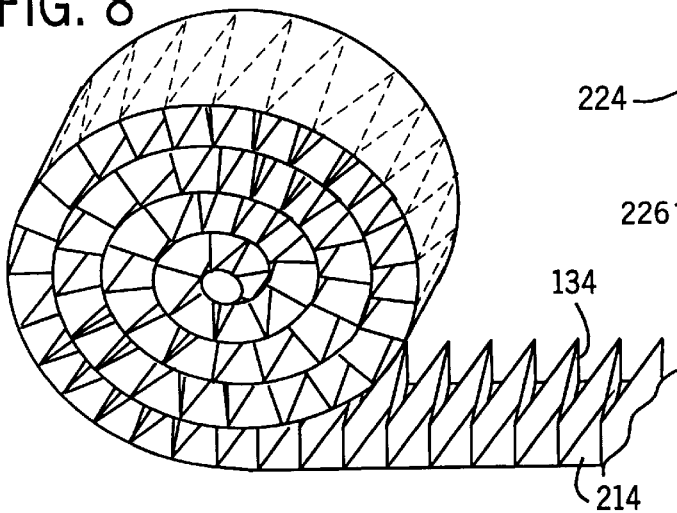
FIG. 8 is a perspective view of a spiral wound corrugated axial filter in accordance with the invention.

In a further embodiment, zig-zag pattern 134 on strip 214 is spiral wound, FIG. 8, such that the noted second and third sheets providing the bottom and top walls are provided by the same single continuous strip of filter or non-filter material 214 spiral wound.

Figure 9:
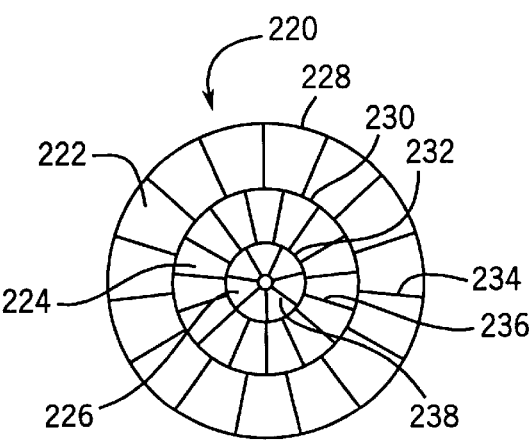
FIG. 9 is an end elevation view of a layered cylindrical corrugated axial filter in accordance with the invention.

Another alternative to the overall rectangular shape of the stack of FIG. 7 is a cylindrical stack 220, FIG. 9, formed by a plurality of layered annular rows 222, 224, 226, etc. each having a base strip 228, 230, 232, respectively, comparable to strip 214, and a zig-zag pattern 234, 236, 238, respectively, thereon comparable to zig-zag pattern 134, and formed in a respective closed loop annulus, each of different diameter for nested concentric fit.

Strip 130, FIG. 5, is a continuous sheet of filter material extending along a longitudinal direction, which is left and right in FIG. 5. The sheet is folded into the zig-zag pattern 134 along the noted plurality of parallel lateral fold lines 132 each perpendicular to the noted longitudinal direction. After folding, the zig-zag pattern 134 of sheet 130 has a plurality of sections extending back and forth in zig-zag manner between a front set of apexes formed by the noted first set of fold lines, and a rear set of apexes formed by the noted second set of fold lines. The zig-zag pattern 134 has the noted top edges such as 198, 202, etc., and the noted bottom edges such as 200, 204, etc. extending in zig-zag manner between the front and rear sets of apexes. Strip 214 provides bottom wall 190 along the bottom edges. A separate strip 218 may provide top wall 188 along the noted top edges, which strip 218 may be the bottom wall of the row of flow channels thereabove, or alternatively, the top wall 188 may be provided by the same strip 214 providing bottom wall 190 when spiral wound, FIG. 8.

It is recognized that various equivalents, alternatives and modifications are possible within the scope of the appended claims.

What is claimed is:

1. A corrugated axial filter for filtering fluid, said filter having an upstream dirty frontside and a downstream clean backside, said filter having a plurality of flow channels extending axially from said upstream dirty frontside to said downstream clean backside, each channel having an upstream opening at said upstream dirty frontside and having top and bottom walls and right and left sidewalls extending from said opening rearwardly toward said downstream clean backside, said right and left sidewalls tapering towards each other as they extend rearwardly to define a triangular shaped flow channel, wherein right and left sidewalls of adjacent flow channels are a single continuous sheet of filter material in a zig-zag pattern with a plurality of fold lines comprising a first set of fold lines at said upstream dirty frontside and a second set of fold lines at said downstream clean backside, wherein:
the top wall of a first flow channel is the bottom wall of a second flow channel immediately above said first flow channel;
the bottom wall of said first flow channel is the top wall of a third flow channel immediately below said first flow channel;
a nondoubled single layer second sheet comprises both said top wall of said first flow channel and said bottom wall of said second flow channel, said second sheet having a top surface facing upwardly into said second flow channel, said second sheet having a bottom surface facing downwardly into said first flow channel;
a nondoubled single layer third sheet comprises both said bottom wall of said first flow channel and said top wall of said third flow channel, said third sheet having a top surface facing upwardly into said first flow channel, said third sheet having a bottom surface facing downwardly into said third flow channel.

2. The invention according to claim 1 wherein:
the total combined thickness of said top wall of said first flow channel and said bottom wall of said second flow channel is a single layer thickness;
the total combined thickness of said bottom wall of said first flow channel and said top wall of said third flow channel is a single layer thickness.

3. The invention according to claim 1 wherein said second and third sheets are provided by the same single continuous strip spiral wound.

4. The invention according to claim 1 wherein said second and third sheets are provided by separate strips and wherein said filter with said plurality of flow channels has an overall rectangular shape.

5. The invention according to claim 1 wherein at least one of said second and third sheets is a sheet of filter material.

6. The invention according to claim 1 wherein at least one of said second and third sheets is a sheet of non-filter material.

7. The invention according to claim 1 wherein said fluid is air.

8. The invention according to claim 1 wherein said fluid is gas.

9. The invention according to claim 1 wherein said fluid is liquid.

10. A method of making a corrugated axial filter comprising providing a continuous sheet of filter material extending along a longitudinal direction, folding said sheet into a zig-zag pattern along a plurality of parallel lateral fold lines each perpendicular to said longitudinal direction, said sheet in said zig-zag pattern having a plurality of sections extending back and forth in zig-zag manner between a front set of apexes formed by a first set of said fold lines, and a rear set of apexes formed by a second set of said fold lines, said zig-zag pattern having top and bottom edges extending in said zig-zag manner between said front and rear sets of apexes, providing a bottom wall along said bottom edges, providing a top wall along said top edges, to form a plurality of flow channels each having an upstream opening at an upstream dirty frontside and having left and right sidewalls formed by adjacent said sections of said zig-zag pattern, said left and right sidewalls extending rearwardly from respective front apexes on opposite right and left sides of said opening, said left and right sidewalls tapering towards each other as they extend rearwardly and merging at a rear apex to define a triangular shaped said flow channel, such that left and right sidewalls of adjacent flow channels are a single continuous sheet of filter material in said zig-zag pattern with a plurality of fold lines comprising said first set of fold lines at said upstream dirty frontside of said filter and a second set of fold lines at a downstream clean backside of said filter said flow channels extending axially from said upstream dirty frontside to said downstream clean backside, and comprising:

forming the top wall of a first flow channel as the bottom wall of a second flow channel immediately above said first flow channel;

forming the bottom wall of said first flow channel as the top wall of a third flow channel immediately below said first flow channel;

providing a nondoubled single layer second sheet as both said top wall of said first flow channel and said bottom wall of said second flow channel, said second sheet having a top surface facing upwardly into said second flow channel, said second sheet having a bottom surface facing downwardly into said first flow channel;

providing a nondoubled single layer third sheet as both said bottom wall of said first flow channel and said top wall of said third flow channel, said third sheet having a top surface facing upwardly into said first flow channel.

\* \* \* \* \*